US007906581B2

(12) United States Patent
Lee et al.

(10) Patent No.: US 7,906,581 B2
(45) Date of Patent: Mar. 15, 2011

(54) METHOD, APPARATUS AND SYSTEM FOR PREPARING ADHESIVE-PROMOTER-TREATED HOT MELT ADHESIVES IN CONTINUOUS MODE

(75) Inventors: Frank Ping-Hay Lee, Oakville (CA); Tie Hwee Ng, Mississauga (CA); Sheau Van Kao, Oakville (CA); Guiqin Song, Milton (CA)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 11/850,138

(22) Filed: Sep. 5, 2007

(65) Prior Publication Data
US 2009/0062464 A1 Mar. 5, 2009

(51) Int. Cl.
*C08G 63/91* (2006.01)
*B01J 19/24* (2006.01)

(52) U.S. Cl. ........... 525/52; 156/327; 156/329; 422/135; 422/198; 422/225; 525/342; 526/935

(58) Field of Classification Search ................ 422/225, 422/197; 525/52
See application file for complete search history.

(56) References Cited

U.S. PATENT DOCUMENTS

| | | | | |
|---|---|---|---|---|
| 4,875,847 A * | 10/1989 | Wenger et al. | ............... | 425/204 |
| 4,983,641 A * | 1/1991 | Gross et al. | ...................... | 521/82 |
| 5,255,974 A * | 10/1993 | Signer | ........................... | 366/336 |
| 6,310,170 B1 * | 10/2001 | Johnston et al. | ............... | 528/38 |
| 6,323,285 B1 * | 11/2001 | Johnston et al. | ............... | 525/242 |
| 6,410,772 B2 * | 6/2002 | Okuyama et al. | ............. | 556/479 |
| 2004/0102558 A1* | 5/2004 | Lin et al. | ....................... | 524/417 |
| 2007/0190345 A1* | 8/2007 | Sutter et al. | .................. | 428/448 |

FOREIGN PATENT DOCUMENTS

WO 2004/037941 * 5/2004

OTHER PUBLICATIONS

Mann, Reactor Technology, Kirk-Othmer Encyclopedia of Chemical Technology, Sep. 15, 2006.*
U.S. Appl. No. 11/623,509, filed Jan. 16, 2007 by Gaiqin Song et al.

* cited by examiner

*Primary Examiner* — Vasu Jagannathan
*Assistant Examiner* — Robert C Boyle
(74) *Attorney, Agent, or Firm* — Oliff & Berridge, PLC

(57) ABSTRACT

Methods, apparatuses, and systems for manufacturing a hot melt adhesive containing an adhesion promoter in a continuous mode include supplying a melted, hot melt adhesive to a mixing device at a first predetermined rate while simultaneously supplying an adhesion promoter to the same mixing device at a second predetermined rate to form a homogeneous admixture containing the hot melt adhesive and adhesion promoter. The hot melt adhesive/adhesion promoter mixture is subsequently reacted in at least one tubular reactor at a predetermined temperature for a predetermined residence time to allow the adhesion promoter to chemically bond with the hot melt adhesive and form an adhesive-promoter-treated hot melt adhesive. The adhesion-promoter-treated hot melt adhesive is collected in a product receiver and may be further processed.

23 Claims, 7 Drawing Sheets

METHOD, APPARATUS AND SYSTEM FOR PREPARING ADHESIVE-PROMOTER-TREATED HOT MELT ADHESIVES IN CONTINUOUS MODE

RELATED APPLICATIONS

The present disclosure is related to co-pending U.S. patent application Ser. No. 11/623,509, filed Jan. 16, 2007, the entirety of which is herein incorporated by reference. U.S. patent application Ser. No. 11/623,509 describes an adhesion promoter for hot melt adhesives and pressure sensitive adhesives, comprising a silane composition formed by admixing a hydrolytic silane compound with an aqueous buffer solution.

BACKGROUND

The present disclosure generally relates to manufacturing methods and apparatuses for producing in a continuous mode, a hot melt adhesive that incorporates an adhesion promoter, such as a stabilized silane compound.

Xerographic digital presses, such as the XEROX IGEN3 press have been developed for the production of publications, such as book-on-demand, brochures and manuals. Many of such applications involve bookbinding by applying a hot melt adhesive. However, poor adhesion may result using conventional adhesives due to fuser oil contamination on the xerographic print.

In a typical imaging device, a light image of an original to be copied is recorded in the form of a latent image upon a photosensitive member, and the latent image is subsequently rendered visible by the application of resin particles and pigment particles, or toner. The visible toner image is then in a loose powdered form and can be easily disturbed or destroyed. The toner image may be fixed or fused upon a support, which may be a support sheet such as plain paper, using a fuser roll.

To ensure and maintain good release properties of the fuser roll, it has become customary to apply release agents to the fuser roll during the fusing operation. Typically, these materials are applied as thin films of, for example, nonfunctional silicone oils or mercapto- or amino-functional silicone oils, to prevent toner offset. However, these fuser oils can significantly lower the surface free energy of the xerographic print, thereby reducing the adhesion of an adhesive used to bind xerographic prints into a book, manual, or the like.

The addition of an adhesion promoter to hot melt adhesives or pressure sensitive adhesives improves adhesion to very low surface free energy substrates. The adhesion promoter improves the thermal stability of the adhesive and the viscosity of the adhesive remains relatively constant at temperatures, for example, ranging from about 100° C. to about 200° C. The adhesive containing the adhesion promoter is thus able to bind very low surface free energy substrates such as Xerographic prints contaminated with fuser oil, and maintains a substantially stable viscosity at adhesive application or operating temperatures from about 100° C. to 200° C.

An example of an adhesion promoter that is well suited for hot melt adhesives used with xerographic prints is a hydrolytic silane compound admixed with aqueous buffer solution. These compounds are described in co-pending U.S. patent application Ser. No. 11/623,509, filed Jan. 16, 2007, the entirety of which is herein incorporated by reference. As described in this disclosure, the hydrolytic silane compound may include at least one silane group of $-\text{Si}(R)_{3-m}X_m$, wherein R is a non-hydrolyzable organic group, X is a hydrolytic group and m is an integer of 1 to 3.

Typically, a hot melt adhesive that includes an adhesion promoter is made using a batch process, often due to the small quantities of adhesive needed at one time. A problem that may occur during a batch process is the degradation of the hot melt adhesive if the adhesive is stored for too long at the temperature at which the reaction between the hot melt adhesive and the adhesion promoter occurs. Another problem that may result from batch processing is inconsistency between the end products from different batches. Finally, an adhesive that incorporates a conventional adhesion promoter may encounter issues associated with the pot life of the adhesive. That is, the adhesive may not be able to be kept long enough in a hot pot to meet the requirements during the application process, for example in bookbinding applications. The viscosity of the adhesive containing a conventional adhesion promoter may continuously increase and cause operating problems.

It is thus desirable to avoid these problems by using a manufacturing process and apparatus that allows the hot melt adhesive containing an adhesion promoter to be produced in a continuous mode, thereby maintaining the thermal stability of the adhesive, sufficiently long adhesive pot life and constant viscosity of the adhesive during the application process.

SUMMARY

A method for manufacturing a hot melt adhesive containing an adhesion promoter in a continuous mode is provided. The method includes supplying a melted, hot melt adhesive to a mixing device at a first predetermined rate; simultaneously supplying an adhesion promoter to the same mixing device at a second predetermined rate to form a homogeneous or uniformly blended admixture containing the hot melt adhesive and adhesion promoter; subsequently reacting the hot melt adhesive/adhesion promoter mixture in at least one tubular reactor at a predetermined temperature for a predetermined residence time to allow the adhesion promoter to chemically bond with the hot melt adhesive and form an adhesive-promoter-treated hot melt adhesive; and collecting the adhesion-promoter-treated hot melt adhesive in a product receiver adapted for supplying the adhesion-promoter-treated hot melt adhesive to at least one finishing device.

An apparatus and system for manufacturing a hot melt adhesive containing an adhesion promoter in a continuous mode is also provided. The apparatus includes a combined melter and pump for supplying a hot melt adhesive; a first tank and pump for supplying an adhesion promoter; at least one mixing device in fluid communication with the combined melter and pump and first tank for simultaneously receiving the hot melt adhesive and adhesion promoter and blending to form a homogeneous or uniformly blended admixture containing the hot melt adhesive and adhesion promoter; at least one, temperature controlled, tubular reactor in fluid communication with the mixing device for receiving the admixture and chemically bonding the hot melt adhesive and adhesion promoter to form an adhesive-promoter-treated hot melt adhesive; and a product receiver for containing the adhesive-promoter-treated hot melt adhesive for subsequent finishing. In the apparatus, any fluid communication line containing the hot melt adhesive is temperature controlled. In addition, the individual components may be mounted on a support structure for providing a single unit or skid-type system that can be installed and used in many manufacturing settings.

EMBODIMENTS

The exemplary embodiments are directed to methods, apparatuses and systems in which an adhesion promoter, such as a stabilized silane compound, is incorporated into a hot melt adhesive. The process is a continuous process in which the reactants and other additives are continuously supplied, mixed, reacted, and stored or formed into a desired end product.

In general, an apparatus may include one or more devices for supplying reactants and additives (also referred to as the "feed components"), at least one mixing unit, at least one reactor, and end product processing devices. A first embodiment of such an apparatus 10 is shown in FIG. 1.

Figure 1:
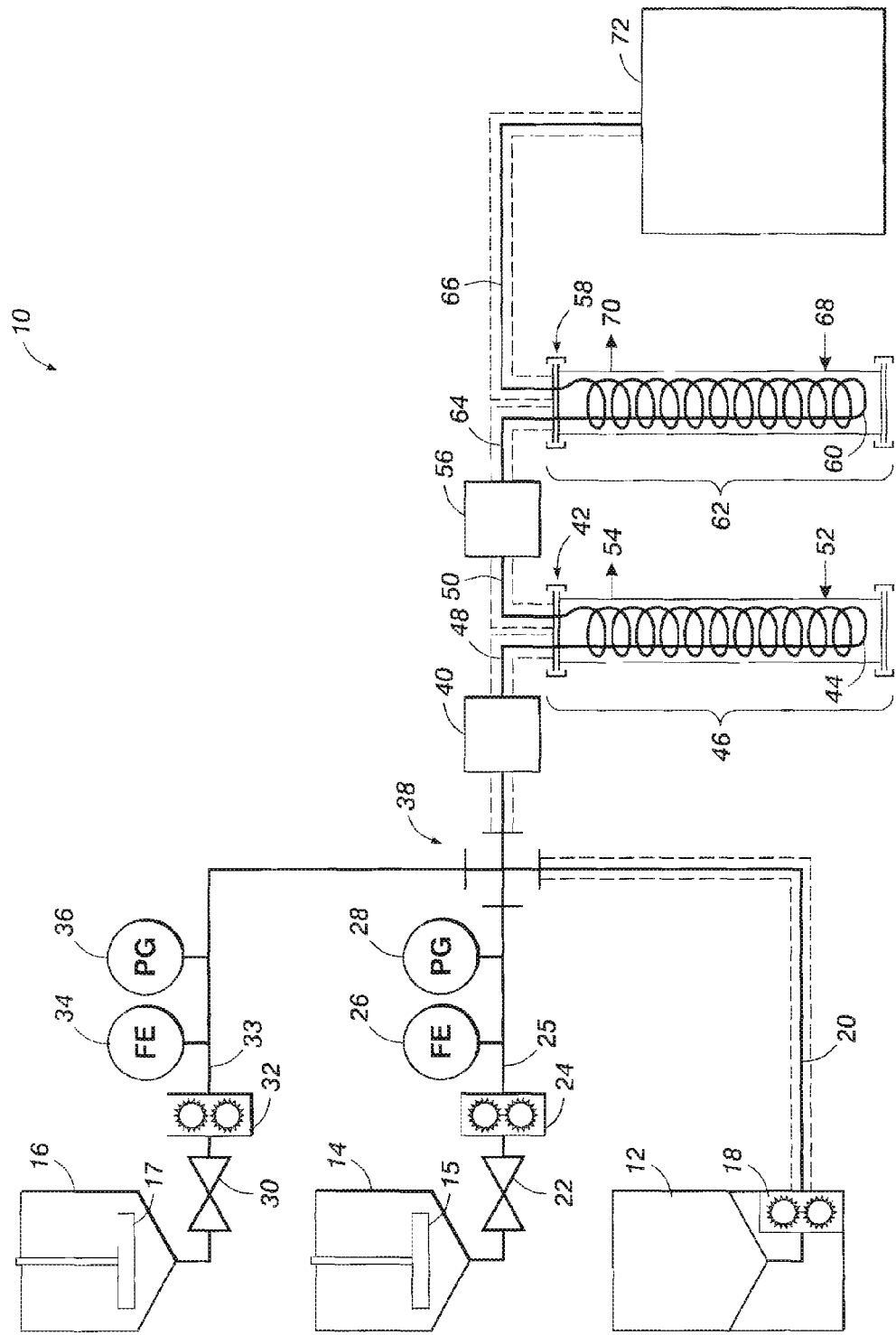
FIG. 1 is a schematic view of a method and apparatus for preparing an adhesive-promoter-treated hot melt adhesives using a jacketed reactor.

Referring to FIG. 1, the supply devices for providing the reactants and other additives may include a tank 12, 14 or 16, an outlet valve 22 or 30, a pump 18, 24 or 32, a flow rate element 26 or 34 and a pressure gage 28 or 36. In a first embodiment, the feed components may include a hot melt adhesive tank 12, an adhesion promoter tank 14 and at least one additive tank 16. An adhesion promoter may be supplied from tank 14 through an outlet valve 22 via pump 24 and a "cross fitting"-type valve 38 to a first mixing device 40. (A "cross fitting" valve may also be referred to as a multi-way valve, such as a two-way or three-way valve designed to combine multiple inlet streams into a single outlet stream.) Similarly, one or more additives may be supplied from tank 16 to the mixing device 40, through, for example, outlet valve 30 via pump 32 and cross fitting 38. Although the combination of an outlet valve 22 or 30, pump 24 or 32 and cross fitting 38 is illustrated, the exemplary embodiments are not so limited. For example, the specific use of a cross fitting may not be required. Instead, any structural configuration to transfer the adhesion promoter 14 or additive 16 to a first mixing device 40 may be implemented.

Typically, the hot melt adhesive is melted for transport to the mixing device 40. A combination melter tank and pump may be used for melting and pumping the hot melt adhesive from a supply source to the mixing device 40. An example of a GRACO commercially available combined melter and pump (available from Gray Company, Inc., Minneapolis, Minn.) includes a 7-liter reservoir for melting hot melt adhesive. This unit includes a gear pump, a heated transfer line, and dispenser for dispensing molten adhesive at a desired flow rate. Alternatively, larger combined melters and pumps are available having 5-gallon built-in reservoirs/tanks or being capable of taking suction from a 55-gallon steel drum.

The supply line 20 from the outlet of the combined melter tank 12 and pump 18 through cross fitting 38 and up to the mixing unit 40 may be temperature controlled, such as by using heat tracing, jacketed lines or another devices to maintain the molten hot-melt adhesive at the desired temperature. Moreover, any fluid line containing molten hot melt adhesive may be temperature controlled.

The adhesion promoter tank 14, pump 24 and supply line 25, and additive tank 16, pump 32 and supply line 33 may be jacketed to allow preheating of these feed components to a desired temperature. Alternatively, these feed components may be supplied at room temperature, or in the range of 10° C.-30° C. A mixer 15 and 17 may be included in the adhesion promoter tank 14 and additive tank 16, respectively, to provide adequate blending of mixtures of compounds contained in these tanks. An example of a tank suitable for containing the adhesion promoter and additive is a 25 gallon jacketed mix tank. An example of a pump for use with the adhesion promoter and additives is a jacketed gear pump, Examples of gear pumps suitable for transferring molten hot melt adhesives at temperature between 100 and 200° C., and viscosity up to 10,000 centipoise are LIQUIFLO 3-series gear pumps (Liquiflo Equipment Co., Garwood, N.J.). A LIQUIFLO Model 31F gear pump with a clamped-on jacket is capable of delivering about 0.5 gpm or (1.89 liters/min) molten adhesive.

The embodiments described above use all feed components in a liquid form. Alternatively, one or more of the feed components may be provided as a gas, or a semi-solid or solid capable of being fluidized and transported. For example, the hot melt adhesive may be provided as small pellets that can be pumped to the mixing device 40. In this embodiment, both melting of the hot melt adhesive and mixing may be performed in the mixing device 40. Alternatively, one or more additive may be provided a gas that will be absorbed in the liquids contained in the mixing device 40.

Examples of hot melt adhesives suitable for use include HM220, available from Horizon and US661 manufactured by U.S. Adhesives. Other suitable hot melt adhesives for use include most commercially available hot melt adhesive, such as polyethylene, poly(ethylene/vinyl acetate), polystyrene, polyamide, a polyolefin based polymer, polyester, phenol-formaldehyde resin, etc., of a homopolymer or a block copolymer based hot melt adhesives. The most common general purpose hot melt adhesive is based on ethylene vinyl acetate (EVA) resins. Other polymers commonly used in hot melt adhesives and pressure sensitive adhesives include low density polyethylene, poly(ethylene/vinyl acetate), polyvinyl alcohol, polystyrene, polyamides, polyalkylene oxide, polyacrylate, ethylene acrylic copolymers, polypropylene (atactic), phenoxy resins, polyesters, APAO, polyesteramides, polyparaffins, polyurethanes, polyurethane prepolymers, thermoplastic acrylic polymers butyl rubbers, polyvinyl acetate and copolymers, styrenic block copolymers (SIS, SBS, SEBS), phenol-formaldehyde resin of polymer or block copolymer, natural rubber, and a copolymer thereof etc.

An example of an adhesion promoter suitable for use is a hydrolytic silane compound admixed with an aqueous buffer solution. In one embodiment, the hydrolytic silane compound comprises at least one silane group of —$Si(R)_{3-m}X_m$, wherein R is a non-hydrolyzable organic group, X is a hydrolytic group and m is an integer of 1 to 3. X may be selected from the group consisting of a halide, a hydroxyl group, a carboxylate group, an alkoxy group, an arylalkyloxy group, and an aryloxy group. The hydrolytic silane compound may also contain, in total, two of the hydrolytic X groups and a functional group selected from the group consisting of an amino group, a mercapto group, an epoxy group and a vinyl group.

In one embodiment, the hydrolytic silane compound is selected from the group consisting of an aminoalkylsilane, a mercaptoalkylsilane or mixtures thereof. In other embodiments, the hydrolytic silane compound is selected from the group consisting of N-(2-aminoethyl)-3-aminopropylmethyldimethoxysilane, N-(2-aminoethyl)-3-aminopropyltrimethoxysilane, N-(2-aminoethyl)-3-aminopropylethyldiethoxysilane, N-(2-aminoethyl)-3-aminopropyltriethoxysilane 4-Aminobutyltriethoxysilane, 1-Amino-2-(Dimethylethoxysilyl)propane, N-(2-aminoethyl)-3-aminoisobutyldimethylmethoxysilane, N-(2-aminoethyl)-3-aminoisobutyldimethylmethoxysilane, (aminoethylaminomethyl)phenethyltrimethoxysilane, N-(2-aminoethyl)-3-aminopropylsilanetriol, N-(6-aminohexyl)aminomethyl-trimethoxysilane, N-(6-aminohexyl)aminopropyl-trimethoxysilane, N-(2-aminoethyl)-11-aminoundecyltrimethoxysilane, 3-aminopropylmethylbis(trimethylsiloxy)silane, 3-aminopropyldimethylethoxysilane, 3-aminopropyltrimethoxysilane, 3-aminopropyltris(methoxyethoxyethoxy)silane, (3-trimethoxysilylpropyl)diethylenetriamine, 3-aminopropyltrimethoxysilane, 3-aminopropyltriethoxysilane, aminoethylaminopropyltrimethoxysilane, aminoethylaminopropyltriethoxysilane, or mixtures thereof. A preferred hydrolytic silane compound is A2120 manufactured by GE Silicones, Wilton, Conn.

The silane compound may be admixed with aqueous buffer solution before incorporation into an adhesive. The aqueous buffer solution may include a buffer agent. The aqueous buffer solution may be made by dissolving the buffer agent into distilled water. The buffer agent may be an inorganic salt, for example an alkali metal phosphate, an alkali metal sulfite and the like or an aqueous solution of an inorganic salt. Other suitable buffer agents include aqueous solutions of potassium phosphate monobasic, potassium phosphate dibasic, sodium hydrogen sulfite, mixtures thereof and the like, for example dissolved in distilled water.

In embodiments, the aqueous buffer solution may include about 1% to about 50% by weight buffer agent, such as, from about 5% to about 25% by weight buffer agent, or, for example, from about 5% to about 15% by weight buffer agent.

In embodiments, the pH of the buffer solution may be, for example, from about 2 to about 10, such as from about 4 to about 9.

In embodiments, the aqueous buffer solution may be added to the silane compound, for example in a silane to buffer solution ratio from 1:0.005 to 1:0.5, such as a ratio of 1:0.15 and for example a ratio of 1:0.35. The buffer solution may be added to the silane compound while agitating the silane compound at room temperature. The silane compound temperature goes up after the adding of the buffer solution because this may be an exothermic reaction process. The adhesion promoter may be kept agitating from about 1 hour to about 3 hours before it is incorporated into hot melt adhesives or pressure sensitive adhesives. The shelf life for the admixed silane compound may be as long as three days or longer at room temperature.

The admixed silane adhesion promoter described herein provides at least two beneficial functions in order to promote adhesion of the adhesive to the substrate: (1) a reactive silicone group, that is, a group reactive with silicone, for bonding with the Xerographic print or substrate, such as a methoxy or an ethoxy group, and (2) an organic component for compatibility with the adhesive.

Examples of other adhesion promoters suitable for use include, but are not limited to, VX-225 (aminofunctional oligosiloxane), N-(2-aminoethyl)-3-aminopropyltrimethoxysilane, N-(2-aminoethyl)-3-aminopropylmethyldimethoxysilane, all available from GE Silicones, Wilton, Conn.

Examples of additives that may be used with a hot melt adhesive include, but are not limited to thermoplastics or materials which appear to be thermoplastic including components such as polymer resins, tackifiers, waxes, plasticizers, antioxidants and filler or combinations thereof. Plasticizers may be added to the commercially available hot melt adhesives or pressure sensitive adhesives to lower the initial viscosity of the adhesive.

Examples of plasticizer suitable for use may include, for example, paraffinic linear oil, naphthenic cycloaliphatic oil, aromatic ring containing oil, white mineral oil commercially available as KAYDOL oil, polyisobutylene commercially available as INDOPOL H300, pentaerythritol tetrabenzoate commercially available as BENZOFLEX S552, trimethyl titrate, commercially available as CITROFLEX 1, N,N-dimethyl oleamide, commercially available as HALCOMID M-18-OL, a benzyl phthalate, commercially available as SANTICIZER 278, mixtures thereof and the like. In embodiments, the plasticizer may be added to the adhesive, for example, in the amount of from about 1 to about 20% by weight, such as from about 5 to about 15% by weight.

In one embodiment, the adhesive is HM220, the adhesion promoter is silane A2120 buffered with 10% $KH_2PO_4$ and the additive is KAYDOL mineral oil. In this embodiment, the mixture includes approximately 93% by weight of the hot melt glue, 4.7% by weight of the mineral oil, and approximately 2.3% by weight of the silane compound.

The feed components (reactants and additives) may be blended in at least one mixing unit 40 or 56, such as shown in FIG. 1, before being supplied to at least one reactor 42 or 58. A mixer suitable for use includes an in-line static mixer, a micromixer, such as an Interdigital micromixer from IMM, Mainz, Germany, or a dynamic mixer, such as a high shear rotor-stator style homogenizer. In general, in-line static mixers are designed to turn heterogeneous feed streams into a more uniformly blended or homogeneous outlet stream. More than one static mixer may be used. In addition, the mixers can be installed in series or in parallel to achieve the desired mixing results. The mixing unit may include an internal mixing valve or it may be a separate device, such as cross fitting 38, shown in the figures.

The reactors 42 and 58 are controlled at a predetermined reaction temperature that allows the adhesive to remain molten and the adhesion promoter to chemically bond with the hot melt adhesive and other additives to form a thermally stable, adhesive mixture. Typically, the reaction temperature is in the range of about 160° C. to 200° C., depending on the adhesive and adhesion promoter that is being used. In one example in which HM220 is the adhesive and A2120 is the adhesion promoter, the reaction temperature is about 170° C. to 190° C., or about 180° C.

Figure 2:
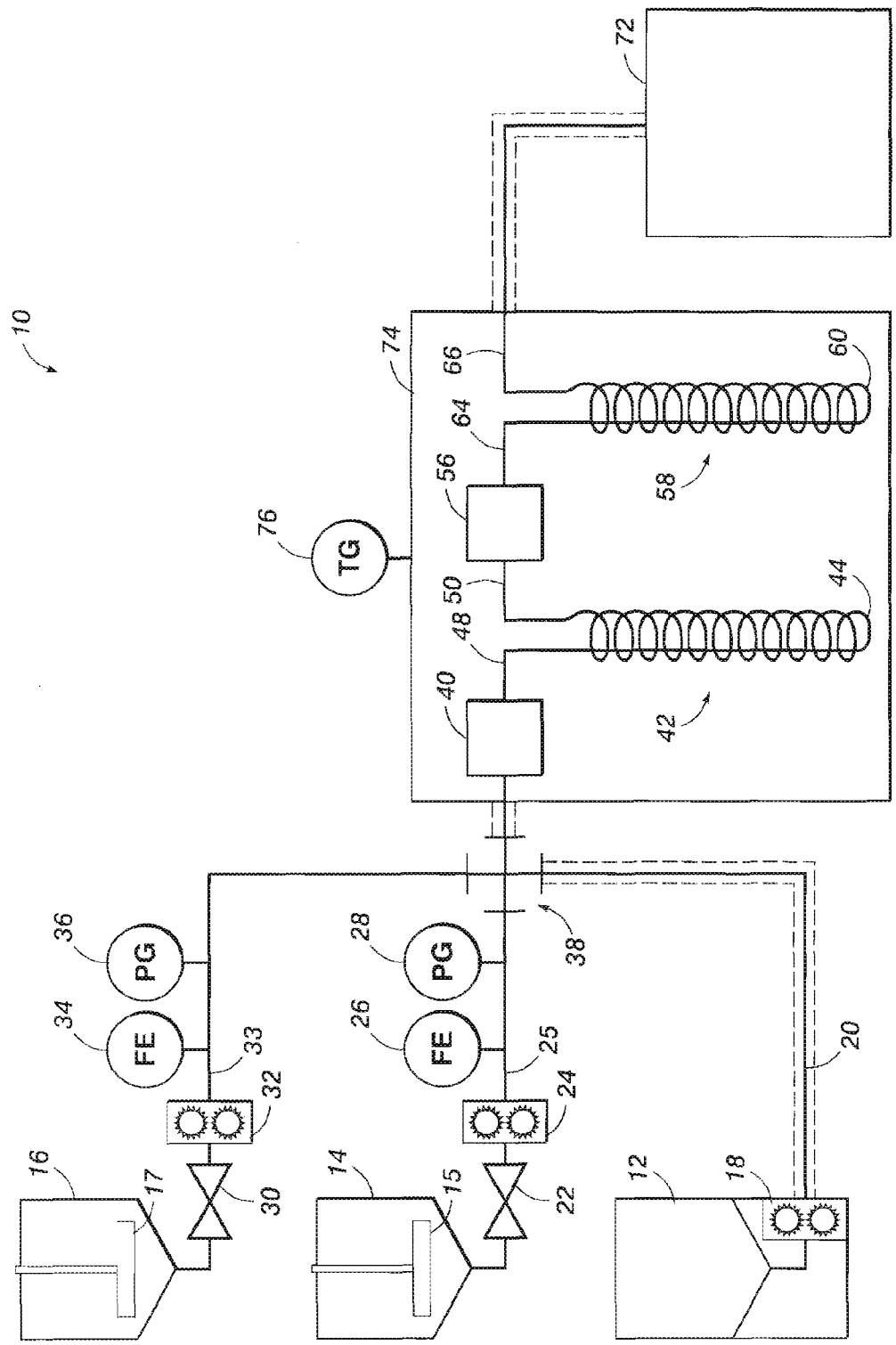
FIG. 2 is a schematic view of a method and apparatus for preparing adhesive-promoter-treated hot melted adhesives using a reactor contained in a heated oven.

A reactor suitable for use, as shown in FIG. 1, is a tubular reactor 42 or 58 containing a wound inner coil 44 or 60 that is surrounded by a shell 46 or 62, respectively. The inner coil 44 or 60 may contain the components to be reacted while the shell 46 or 62 may contain a heating and/or cooling source as provided through inlets 52 and 68 and outlets 54 and 70, respectively. Alternatively, the reactants may be passed through the shell 46 or 62 while the heating/cooling source is passed through the inner coils 44 and 60. Alternatively, as shown in FIG. 2, the tubular reactors 42 and 58 may be housed in a heated oven 74. The heated oven is typically provided with at least a temperature gage 76 and temperature control unit (not shown). In general, the tubular reactors 42 and 58 are configured to provide sufficient residence time for the reaction and sufficient flow rate for adequate heat transfer.

In one embodiment, the inner coils 44 and 60 are constructed from 60 feet of ⅛-inch diameter stainless steel tube such as SS316. The cylindrical shells 46 and 62 are constructed from a 4" diameter stainless steel cylinder that is filled with a heated oil supplied through inlets 52 and 68 that transfers heat to the reactants contained in the inner coils 44 and 60 and is discharged through outlets 54 and 70, respectively.

Figure 3:
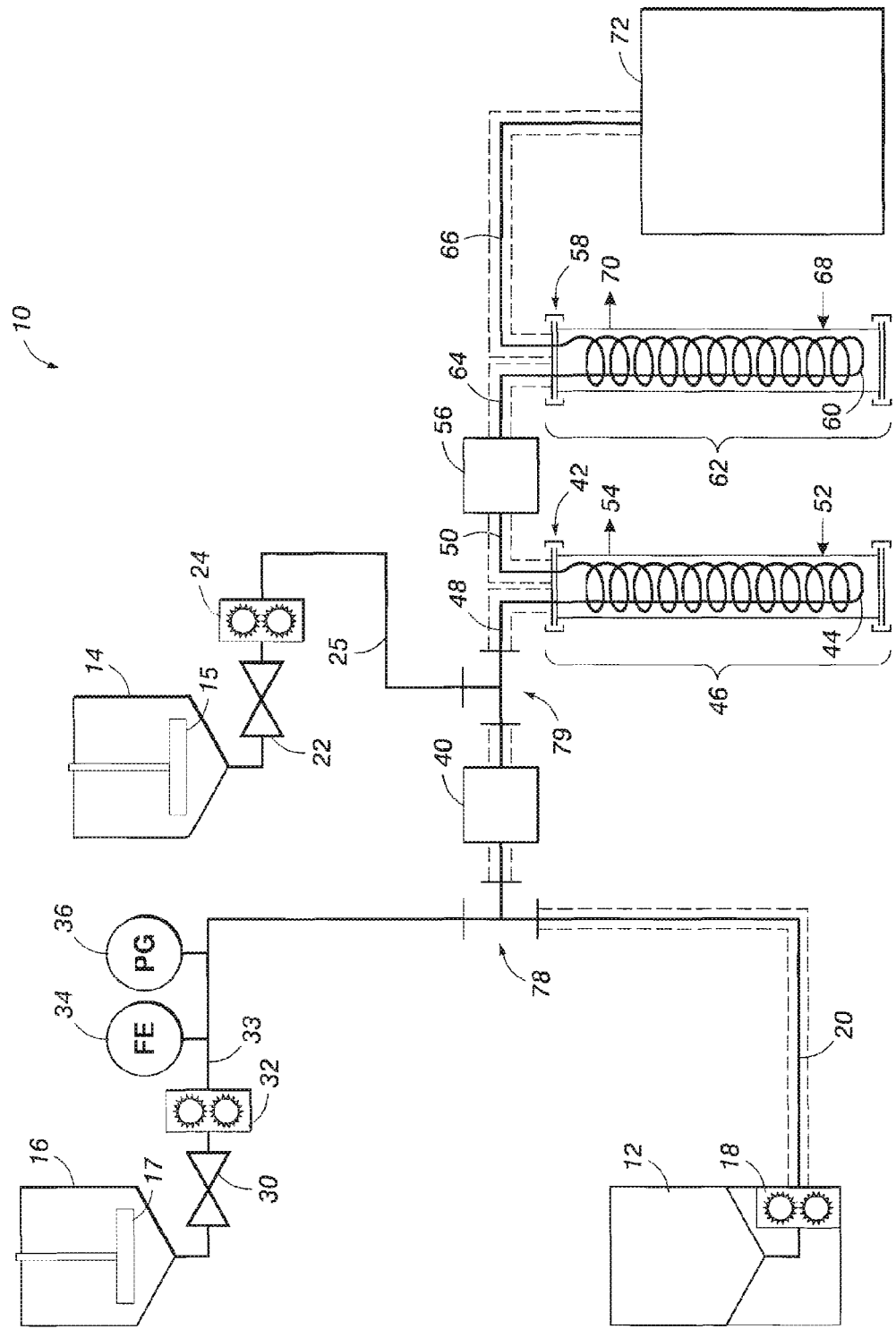
FIG. 3 is a schematic view showing an alternate embodiment of FIG. 1 wherein the adhesive promoter enters the process and apparatus downstream of a reactor.
Figure 4:
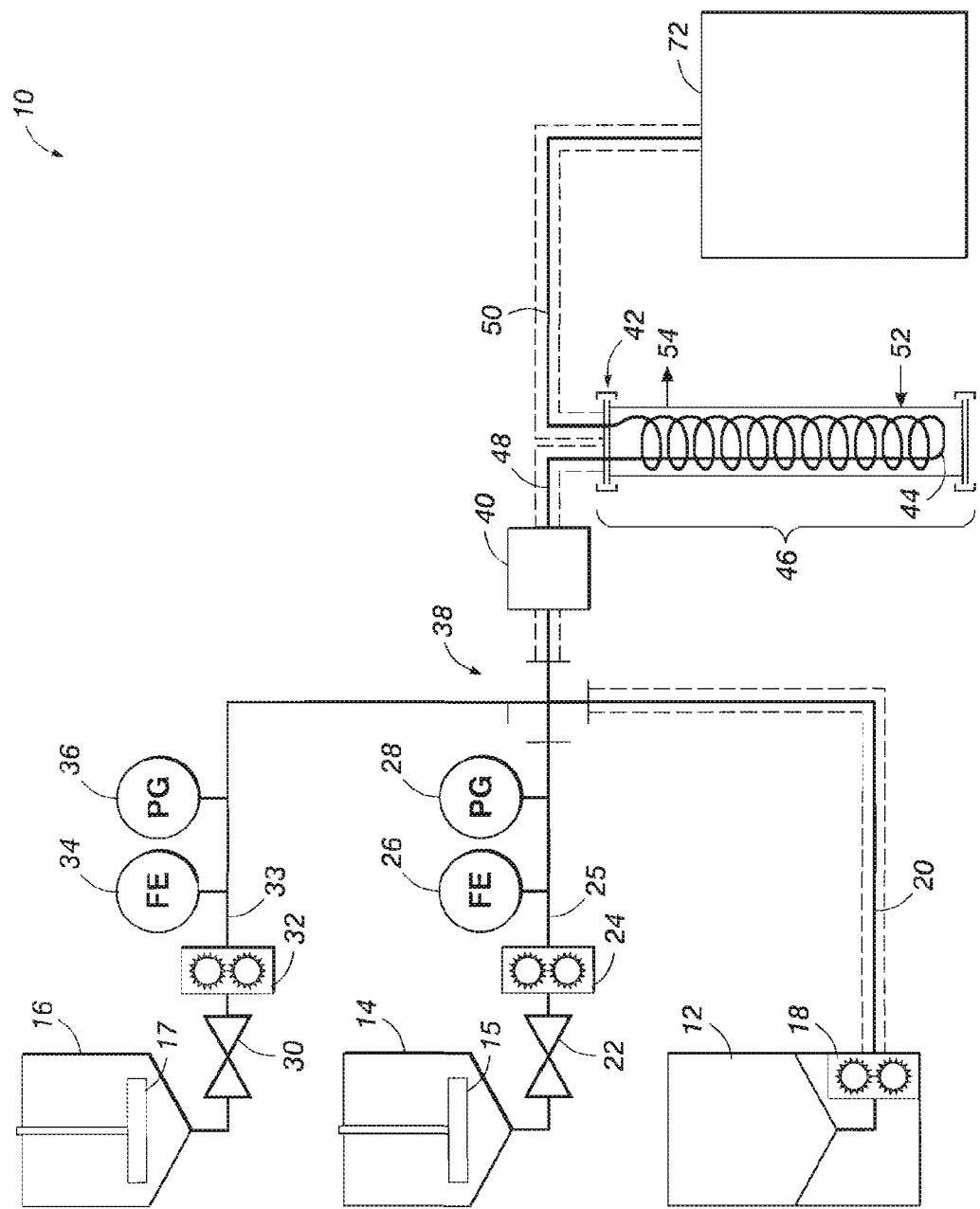
FIG. 4 is a schematic view showing yet another alternative embodiment of FIG. 1 that includes only one reactor.

In the embodiment shown in FIGS. 1 and 2, two tubular reactors 42 and 58 are provided. In an alternative embodiment shown in FIG. 4, only one tubular reactor 42 is provided. Also in the embodiment shown in FIGS. 1 and 2, the reactants (i.e., the hot melt adhesive and adhesion promoter) as well as the additive(s) are provided to the mixing unit 40 prior to entering the first reactor 42. In an alternate embodiment shown in FIG. 3, the hot melt adhesive supplied from tank 12 and the additive(s) supplied from tank 16 are combined through first tee fitting 78 and then mixed in the first mixer 40. The adhesive promoter supplied from tank 14 is supplied to this admixture through second tee fitting 79 after the first mixer 40 and before the admixture enters the first reactor 42.

As shown in FIGS. 1 and 2, once the feed components are mixed and reacted, the adhesive promoter-treated adhesive mixture enters the product receiving unit 72 where it may be stored or formed into a desired shape or form for later use with a variety of printers and presses. With respect to storage the product receiver 72 may be configured to maintain the mixture at a substantially stable viscosity at adhesive application or operating temperatures from about 100° C. to 200° C.

Figure 5:
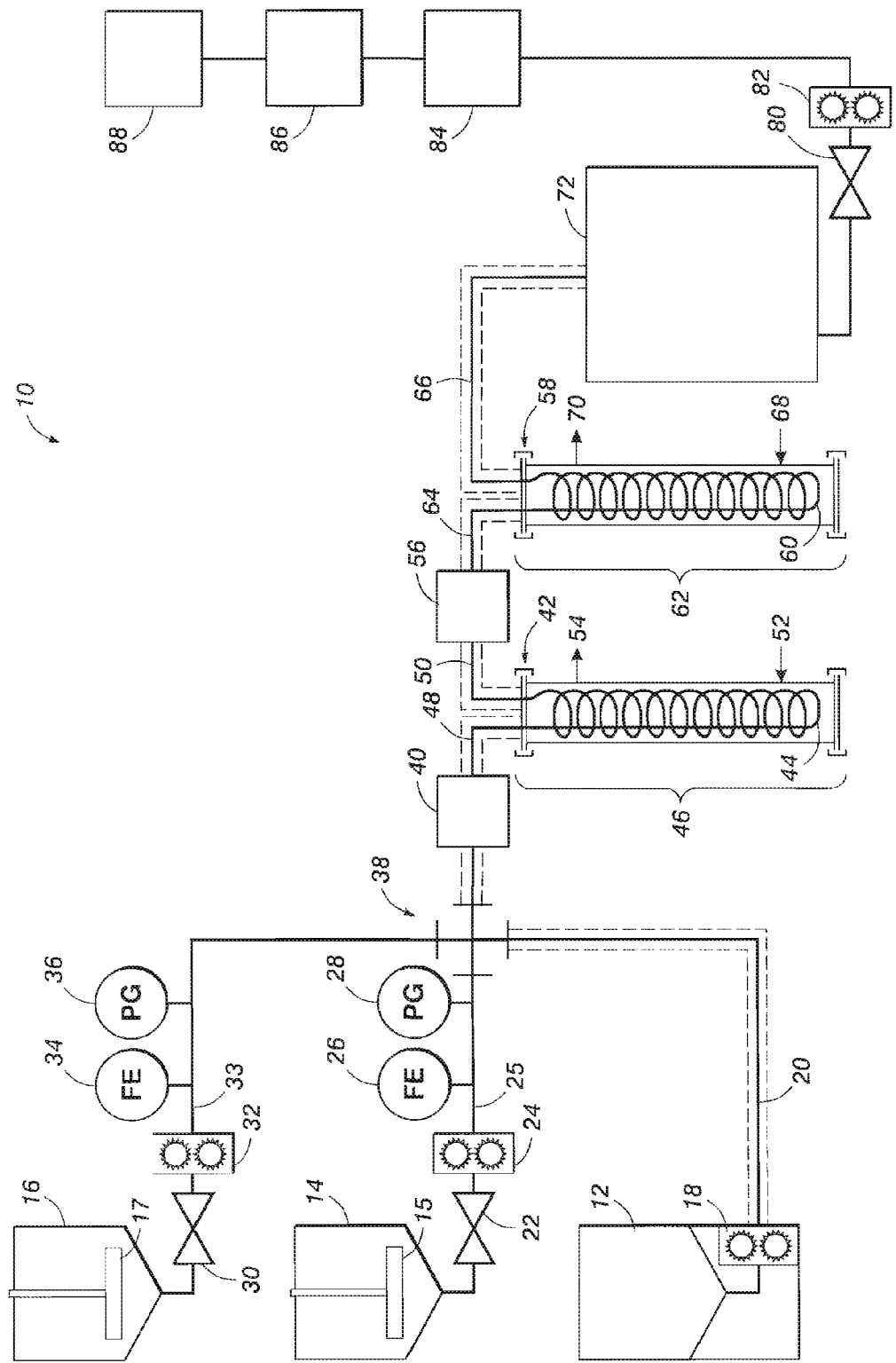
FIG. 5 is a schematic view showing an alternative embodiment of FIGS. 1 and 2 that includes a first end product disposition.
Figure 6:
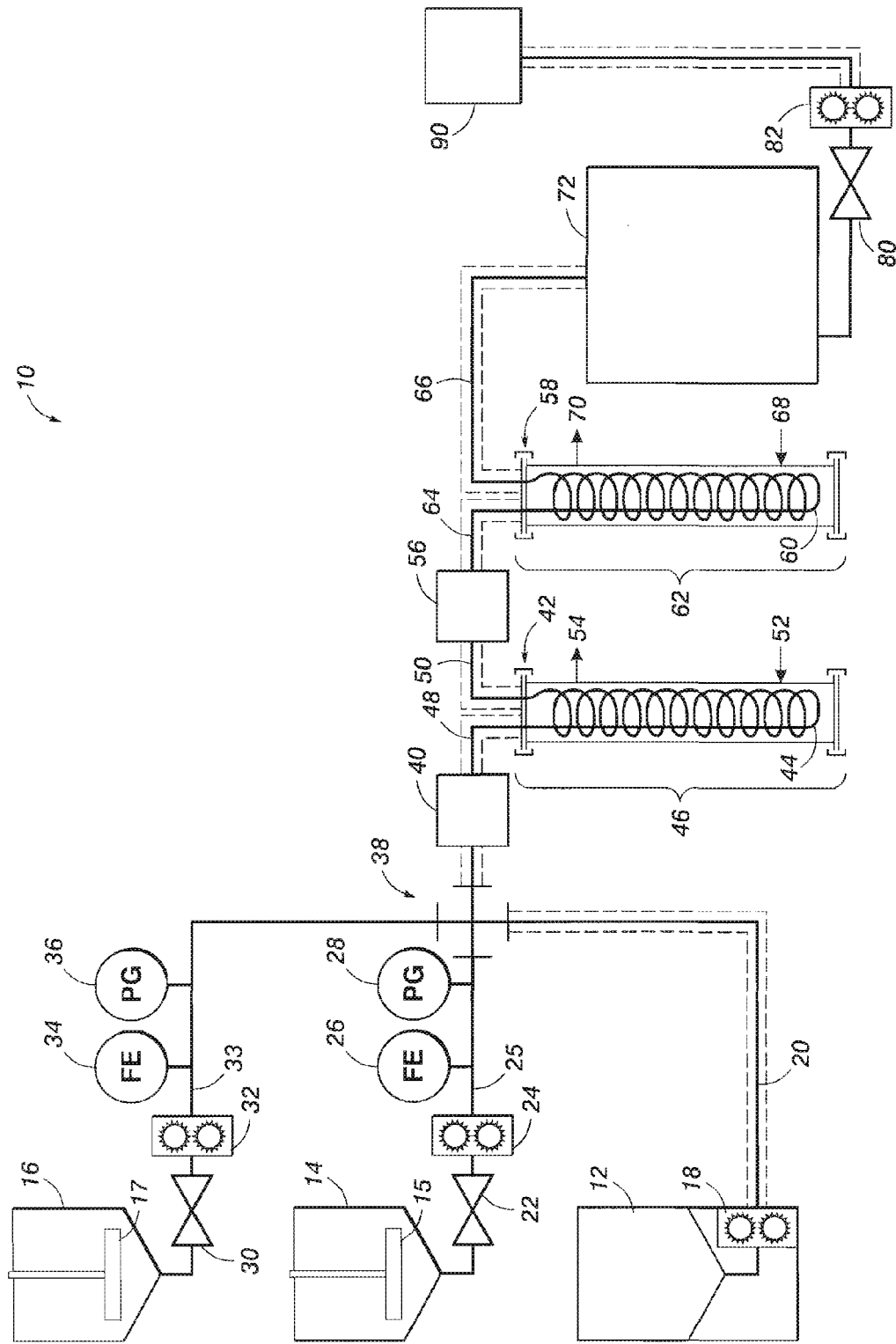
FIG. 6 is a schematic view showing an alternative embodiment of FIGS. 1 and 2 that includes a second end product disposition.
Figure 7:
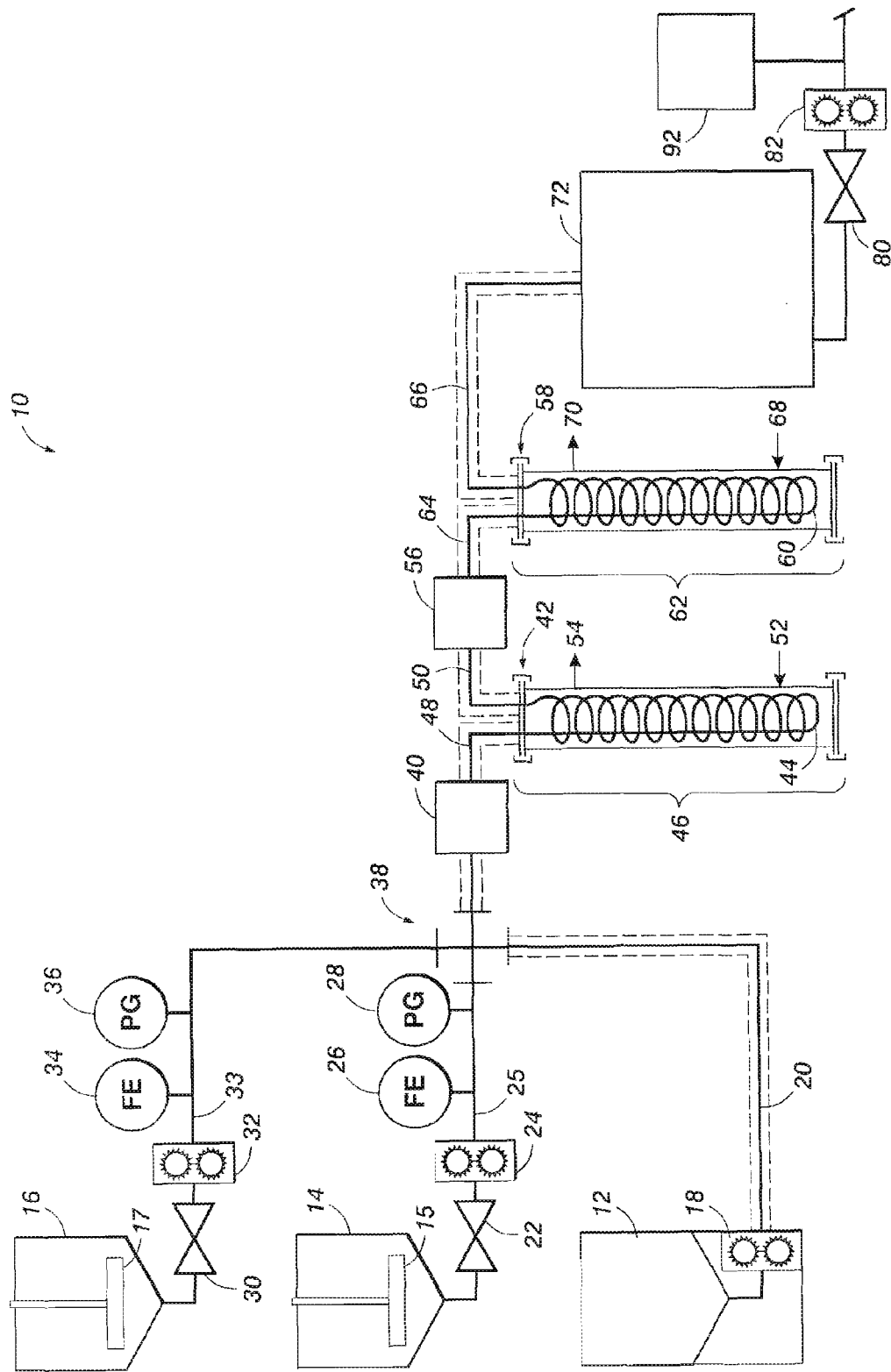
FIG. 7 is a schematic view showing an alternative embodiment of FIGS. 1 and 2 that includes a third end product disposition.

FIG. 5 shows a first product disposition in which the reacted mixture is pumped from the product receiver 72 through an outlet valve 80 and pump 82 into a dye 84, then chill rolled using a chill roller 86, and then cut using a cutter 88 to make chips of a solidified adhesive. FIG. 6 shows another alternative product disposition in which the melted adhesive-promoter-treated adhesive is pumped through an isolation valve 80 via pump 82 into an injection mold 90 and allowed to solidify therein. FIG. 7 shows yet another alternative product disposition in which the melted adhesive-promoter-treated adhesive is pumped through the isolation valve 80 via pump 82 to container 92 adapted for use with a XEROX IGEN3 machine.

The above-described apparatuses 10 may be assembled on a suitable support structure for use as a unitary system in a variety, of manufacturing settings. For example, a skid mounted or modular systems may be built and/or assembled for the purpose of providing portability for removing part or the entire process system when it is temporarily or permanently dormant, which is often the case in an R&D or small production facility. The design of skid modules is determined by access availability for moving the skid and the space available for installing the process system. An example of a skid mounted, modular system suitable for the silane treated hot-melt adhesive process includes a four (4) modules process system which can be set up as follows:

Module I: Feed tank(s), melter(s) and pumps
Module 2: Mixer(s) and tubular reactor(s)
Module 3: Heating and cooling system(s)
Module 4: Product receiver and downstream processing equipment.

The method involves first heating the hot melt adhesive in a melter to about 180° C. to form molten adhesive. Optionally, the tubular reactors 42 and 58 may be preheated to 180° C. by circulating a heat source, such as hot oil from a circulating heating bath (not shown) into the cylindrical shell 46 or 62 of the tubular reactors 42 and 58, respectively as shown in FIG. 1. Alternatively, the heated oven 74 is preheated to 180° C. for the system shown in FIG. 2.

The molten adhesive may be pumped through a heat traced line 20 to the intake of the cross fitting 38 where it is mixed with the adhesion promoter from tank 14 and the additive(s) from tank 16. The feed component mixture is further blended, typically under turbulent flow conditions, in the mixing unit 40, before being passed in the first reactor 42. As shown in FIG. 1, the feed component mixture passes through the inner coil 44 through inlet 48 and outlet 50. The inner coils 44 and 60 are configured in terms of its length and diameter to provide sufficient residence time and heat transfer to achieve a predetermined product yield of the adhesion-promoter-treated adhesive. The design, placement, and number, of mixing units and tubular reactors are to be specified based on the throughput (lb/hr or kg/hr) of the silane treated hot melt adhesive process. Main requirements for the mixing unit(s) and tubular reactor(s) are to provide mass transfer, heat transfer and residence time requirements which are necessary for blending the feed streams into a homogeneous mixture and reacting at 180° C. for a period long enough to achieve the desired viscosity property of between 1,000 and 10,000 centipoise at 180° C., alternatively, between 3,000 and 5,000 centipoise at 180° C. One example of a viscosity measurement device is TA Instruments, Model AR2000 rheometer with a 60 mm diameter, 2 degree cone operating at 100 radian/second.

Other performance measurements that could be used to determine the design, placement, and number, of mixing units and tubular reactors include, but are not limited to product uniformity (such as taking multiple samples from one lot and analyzing for consistent properties) and adhesive performance (such as the "% Fiber Tear" and "Book Binder" test which measure product quality and performance of the binding machine, such as the IGEN3 Binding Machine or a Bourg Model 3002 Book Binding Machine.) The % fiber tear test may be conducted first to determine whether the adhesive meets a minimum threshold for satisfactory adhesion. The test involves the application of an hot melt adhesive to a first substrate, such as a piece of paper, followed by application of a second substrate to the first substrate. In one version of this test, the equipment includes a draw down coater and a laminator. The coater plate is separated in two parts and the temperature can be controlled separately. Only the top part of the coater plate is heated up to the adhesive glue application temperature. The paper to be glued may be kept cold. The adhesive is melted on the top hot plate and then transferred to the cold paper with controlled speed. Another sheet of paper is put on top of the adhesive to form a two-page book. This two-page book is then placed under the laminator and compression is applied with controlled pressure and time. After the desired compression time, the two-page book is removed from the laminator and cooled for a sufficient drying time suitable for the adhesive and substrate being used. One of the substrates is peeled away from the other substrate, which results in one of the substrates tearing. The torn substrate is visually inspected for the percentage of fibers that are torn. The amount of fibers torn is measured, resulting in score having a range of 0 to 100%. The higher the % of fibers torn, the better the adhesive is in terms of performance. An adhesive that scores a minimum of 70% or higher is typically considered to have good adhesive performance. In other embodiments, the performance of the adhesive is 80% fiber tear or higher.

A book binder test involves subjecting a sheet from a book bound with the desired adhesive to a tensile force until the sheet is pulled from the book. A testing device typically includes a fixture that pulls on the sheet and records the value that the sheet pulls out of the book body. In a book having good adhesion properties, a sheet should not tear out of the book below about 80 ft/lbs.

Referring back to the method, the partially reacted, adhesion-promoter-treated adhesive may next be passed through a second mixer 56 before entering the second reactor 58. This partially reacted mixture is passed through the inner coil 60 through inlet 64 and outlet 66. As noted previously, the shell 62 is heated using a heated medium that is supplied through inlet 68 and outlet 70. Once the fully reacted, adhesion-promoter-treated adhesive has passed through the second reactor 58, it may be collected and stored in the product receiver 72, cooled, further processed and shipped for packaging, as described previously with respect to FIGS. 5-7.

In one embodiment, the hot melt adhesive is pumped to the inline static mixer 40 at a rate of 500 grams per minute. The mineral oil is pumped from the feed tank 16 at ambient temperature into the in-line static mixer 40 at a rate of 23 grams per minute. Silane A2120 which has been treated with a buffer solution of 10% $KH_2PO_4$ is pumped from the feed tank 14 to the in-line static mixer 40 at a rate of 11.7 grams per minute.

At these input feed rates, the residence time of material inside the tubular reactor is approximately 13 minutes. Note the residence time inside a tubular reactor may be calculated by dividing the volume inside the reactor by the combined flow rate of all feed materials. For example, the residence time for a tubular reactor constructed of 60 feet of ¼" diameter stainless steel tubing may be about one minute if the flow rate is maintained at the nominal 500 grams per minute.

To ensure process stability of the continuous mode apparatus 10, process or system, it may be desirable to include on-line monitoring instrumentation such as mass flow meters for the feed streams, temperature sensors, and process control systems for controlling flow rate and temperature. To monitor product quality and consistency, it may be desirable to include one or more in-line viscometer(s) in the feed or product streams.

The above-described continuous mode method and apparatus for incorporating and stabilizing an adhesive promoter, such a stabilized silane compound, and one or more hot melt adhesives has advantages over batch processes that include, for example: (1) smaller sized equipment to achieve the same output rate; (2) more consistent product quality once the process reaches a steady state; and (3) lower labor requirements due to simplified materials handling, such as pre-weighing and through proper instrumentation, process automation and control of the continuous process. The above-described continuous mode method and apparatus for incorporating and stabilizing an adhesive promoter, such as a stabilized silane compound, and one or more hot melt adhesives has advantages over batch processes, especially in large scale batch processes which have less effective momentum, mass and heat transfer characteristics and longer batch processing time. Aging test conducted by exposing untreated and silane treated hot melt adhesives to high temperature for prolonged period could result in adverse changes of product quality such as color and viscosity.

The above identified process and apparatus solves or addresses the problem where bookbinding applications that involve applying a hot melt adhesive suffer from poor adhesion due to contamination from fuser oil significantly lowering the surface free energy of xerographic prints. In some severe cases, such as dealing with the XEROX® IGEN3® prints on offset pre-printed paper media, no hot melt glue is available for perfect book binding as most of commercially available hot melt glue/adhesives are formulated for binding non-xerographic prints.

The adhesive-promoter-treated adhesive manufactured by the process or apparatus described herein is thus able to bind very low surface free energy substrates such as Xerographic prints contaminated with fuser oil, and maintains a substantially stable viscosity at adhesive application or operating temperatures from about 100° C. to 200° C.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. Unless specifically recited in the claim, steps or components of claims should not be implied or imported from the specification or any other claims as to any particular order, number, position, size, shape, angle, color, or material.

What is claimed is:

1. A method for manufacturing a hot melt adhesive containing an adhesion promoter in a continuous mode comprising:
   supplying a hot melt adhesive to at least one mixing device at a first predetermined rate;
   supplying an adhesion promoter at a second predetermined rate to form a homogeneous admixture containing the hot melt adhesive and the adhesion promoter, the adhesion promoter comprising a hydrolytic silane compound admixed with an aqueous buffer solution;
   subsequently reacting the admixture in at least one tubular reactor that is separate from the at least one mixing device at from about 160° C. to 200° C. for a predetermined residence time to allow the adhesion promoter to chemically bond with the hot melt adhesive and form an adhesion-promoter-treated hot melt adhesive; and
   collecting the adhesion-promoter-treated hot melt adhesive in a product receiver adapted for supplying the adhesion-promoter-treated hot melt adhesive to at least one finishing device.

2. The method of claim 1, further comprising supplying at least one other additive to the at least one mixing device at a third predetermined rate.

3. The method according to claim 1, wherein the hydrolytic silane compound comprises at least one silane group of —Si$(R)_{3-m}X_m$, wherein R is a non-hydrolyzable organic group, X is a hydrolytic group and m is an integer of 1 to 3.

4. The method according to claim 1, wherein the aqueous buffer solution contains a buffer agent comprising an inorganic salt or an aqueous solution of an inorganic salt.

5. The method according to claim 1, further comprising preheating the tubular reactor before the admixture is reacted therein.

6. The method of claim 3, wherein m is 2 or 3 and X is selected from the group consisting of a halide, a hydroxyl group, a carboxylate group, an alkoxy group, an arylalkoxy group, and an aryloxy group.

7. The method of claim 1, wherein the hydrolytic silane compound further comprises a functional group selected from the group consisting of an amino group, a mercapto group, an epoxy group, and a vinyl group.

8. The method of claim 1, wherein the hydrolytic silane compound is selected from the group consisting of an aminoalkylsilane, a mercaptoalkyl silane, and mixtures thereof.

9. The method of claim 1, wherein the hydrolytic silane compound is selected from the group consisting of N-(2- aminoethyl)-3-aminopropylmethyldimethoxysilane, N-(2-aminoethyl)-3-aminopropyltrimethoxysilane, N-(2-aminoethyl)-3-aminopropylethyldiethoxysilane, N-(2-aminoethyl)-3-aminopropyltriethoxysilane 4-Aminobutyltriethoxysilane, 1-Amino-2-(Dimethylethoxysilyl)propane, N-(2-aminoethyl)-3-aminoisobutyldimethylmethoxysilane, N-(2-aminoethyl)-3-aminoisobutyldimethylmethoxysilane, (aminoethylaminomethyl)phenethyltrimethoxysilane, N-(2-aminoethyl)-3-aminopropylsilanetriol, N-(6-aminohexyl)aminomethyl-trimethoxysilane, N-(6-aminohexyl)aminopropyl-trimethoxysilane, N-(2-aminoethyl)-11-aminoundecyltrimethoxysilane, 3-aminopropylmethylbis(trimethylsiloxy)silane, 3-aminopropyldimethylethoxysilane, 3-aminopropyltrimethoxysilane, 3-aminopropyltris(methoxyethoxyethoxy)silane, (3-trimethoxysilylpropyl)diethylene-triamine, 3-aminopropyltrimethoxysilane, 3-aminopropyltriethoxysilane, aminoethylaminopropyltrimethoxysilane, aminoethylaminopropyltriethoxysilane, and mixtures thereof.

10. The method of claim 2, wherein:
the at least one other additive is a plasticizer selected from the group consisting of paraffinic linear oil, naphthenic cycloaliphatic oil, aromatic ring containing oil, white mineral oil, polyisobutylene, pentaerythritol tetrabenzoate, trimethyl titrate, N,N-dimethyl oleamide, a benzyl phthalate, and mixtures thereof; and
the plasticizer is added in an amount of from about 1 to about 20% by weight of the adhesive.

11. The method of claim 10, wherein the plasticizer is added in an amount of from about 1 to about 5% by weight of the adhesive.

12. The method of claim 1, wherein a ratio of the hydrolytic silane compound to a water in the aqueous buffer solution ranges from about 1:0.05 to about 1:0.5 by weight.

13. The method of claim 1, wherein the aqueous buffer solution comprises from about 5% to about 25% by weight buffer agent.

14. The method of claim 1, wherein the aqueous buffer solution comprises from about 5% to about 15% by weight buffer agent.

15. The method of claim 1, wherein the aqueous buffer solution has a pH of from about 4 to about 9.

16. The method of claim 4, wherein the buffer agent is an alkali metal phosphate or an alkali metal salt.

17. The method of claim 4, wherein the buffer agent is selected from the group consisting of potassium phosphate monobasic, potassium phosphate dibasic, sodium hydrogen sulfite, and mixtures thereof.

18. The method of claim 1, wherein the adhesion-promoter-treated hot melt adhesive has about 80% to 100% of fibers torn when subjected to a fiber tear test which is comprised of:
separating a coater plate into two parts,
heating a top part of the coater plate to an application temperature of the adhesion-promoter-treated hot melt adhesive,
melting the adhesion-promoter-treated hot melt adhesive on the top plate,
transferring the adhesion-promoter-treated hot melt adhesive to a paper with controlled speed,
placing another sheet of paper on top of the adhesion-promoter-treated hot melt adhesive to form a two-page book,
applying controlled compression for a controlled amount of time to the two-page book,
cooling and drying the adhesion-promoter-treated hot melt adhesive,
peeling away a page from the two-page book resulting in tearing, and
visually inspecting for a percentage of fibers that are torn.

19. The method of claim 1, wherein the first predetermined rate is 500 grams per minute.

20. The method of claim 1, wherein the second predetermined rate is 11.7 grams per minute.

21. The method of claim 1, wherein the at least one mixing device is a static mixer.

22. The method of claim 1, wherein the adhesion promoter is supplied to the at least one mixing device at the second predetermined rate.

23. The method of claim 1, wherein the adhesion promoter is supplied to the tubular reactor separate from the at least one mixing device at the second predetermined rate.

* * * * *